(12) United States Patent
Fortier

(10) Patent No.: US 6,554,235 B1
(45) Date of Patent: Apr. 29, 2003

(54) SUPPORT POST WITH ADJUSTABLE ACCESSORY SUPPORTS

(75) Inventor: Michel Fortier, Montreal (CA)

(73) Assignee: Force et Forme, Montreal (CA)

( * ) Notice: Subject to any disclaimer, the term of this patent is extended or adjusted under 35 U.S.C. 154(b) by 0 days.

(21) Appl. No.: 09/433,951

(22) Filed: Oct. 29, 1999

(51) Int. Cl.[7] ............................................. F16M 13/00
(52) U.S. Cl. ............................... 248/122.1; 248/125.8; 248/200.1; 248/229.24; 248/231.61
(58) Field of Search ......................... 248/125.8, 159, 248/157, 354.1, 354.3, 122.1, 124.2, 229.24, 231.61, 188.5, 200.1; 52/632, 726.3, 731.4, 731.5, 736.1; 403/381, 374.3, 109.5; 24/514, 569, 525

(56) References Cited

U.S. PATENT DOCUMENTS

| | | | | |
|---|---|---|---|---|
| 2,504,392 A | * | 4/1950 | Carter ........................ 248/353 |
| 2,602,863 A | * | 7/1952 | Raymond et al. ........... 379/455 |
| 2,735,519 A | * | 2/1956 | Frischman .................. 403/381 |
| 2,855,255 A | * | 10/1958 | Sonderstrup ................ 403/256 |
| 2,970,798 A | * | 2/1961 | Fritchle et al. ........ 248/229.25 |
| 3,071,350 A | | 1/1963 | Opie |
| 3,333,808 A | * | 8/1967 | DuBoff ..................... 248/200.1 |
| 3,574,367 A | * | 4/1971 | Jankowski .................. 403/201 |
| 3,966,342 A | * | 6/1976 | Moriya ........................ 403/256 |
| 4,049,230 A | * | 9/1977 | Minniear ............... 248/222.14 |
| 4,163,537 A | | 8/1979 | Mourgue |
| 4,485,597 A | * | 12/1984 | Worrallo ..................... 403/255 |
| 4,549,832 A | * | 10/1985 | Sterl ............................ 16/277 |
| 4,666,111 A | | 5/1987 | Schuler |
| 4,690,192 A | * | 9/1987 | Stilling ........................ 160/395 |
| 4,725,030 A | * | 2/1988 | Miller et al. ........... 248/297.21 |
| 4,757,778 A | * | 7/1988 | Scaglia ........................ 114/97 |
| 4,787,768 A | * | 11/1988 | Lange ..................... 248/230.8 |
| 4,869,378 A | * | 9/1989 | Miller ......................... 211/62 |
| 4,905,944 A | | 3/1990 | Jost et al. |
| 4,928,916 A | * | 5/1990 | Molloy ..................... 248/354.1 |
| 4,941,763 A | * | 7/1990 | Euteneuer ...................... 403/3 |
| 4,966,340 A | | 10/1990 | Hunter |
| 5,188,323 A | | 2/1993 | David |
| 5,322,253 A | | 6/1994 | Stevens |
| 5,355,539 A | | 10/1994 | Boettger |
| 5,379,566 A | * | 1/1995 | Schworer ..................... 52/632 |
| 5,385,323 A | * | 1/1995 | Garelick ..................... 248/161 |
| 5,400,737 A | * | 3/1995 | Salazar ........................ 116/174 |
| 5,433,551 A | * | 7/1995 | Gordon ....................... 403/377 |
| 5,649,565 A | | 7/1997 | Mulla |
| 5,813,641 A | | 9/1998 | Baldwin |
| 5,848,501 A | * | 12/1998 | Taipale et al. ............. 52/126.4 |
| 5,899,423 A | * | 5/1999 | Albertini ................. 248/188.8 |
| 6,106,186 A | * | 8/2000 | Taipale et al. ........... 403/322.4 |
| 6,119,317 A | * | 9/2000 | Pfister ........................ 24/514 |
| 6,161,262 A | * | 12/2000 | Pfister ........................ 24/514 |
| 6,402,420 B1 | * | 6/2002 | Yang ........................... 403/381 |
| 6,442,805 B2 | * | 9/2002 | Pfister ........................ 24/514 |

\* cited by examiner

Primary Examiner—Kimberly Wood
Assistant Examiner—Naschica S. Morrison
(74) Attorney, Agent, or Firm—Michel Sofia; Swabey Ogilvy Renault

(57) ABSTRACT

An upright support structure comprises a telescopic post having a number of longitudinally extending grooves circumferentially distributed on the periphery thereof for clamping engagement with support brackets having respective pairs of commonly operable groove engaging members. Each bracket is adapted to support a variety of accessories in one of different available orientations. A locking device is operatively associated with the telescopic post to provide for incremental adjustment of the length thereof. This is useful when it is desired to securely mount the telescopic post between a floor and a ceiling structure. The post can also be mounted on a mobile base or, alternatively, pivotally mounted between a stationary base and an overhead fixture. Finally, the telescopic post is provided with an internal guiding structure to ensure proper alignment of the post segments forming part of the telescopic post.

5 Claims, 5 Drawing Sheets

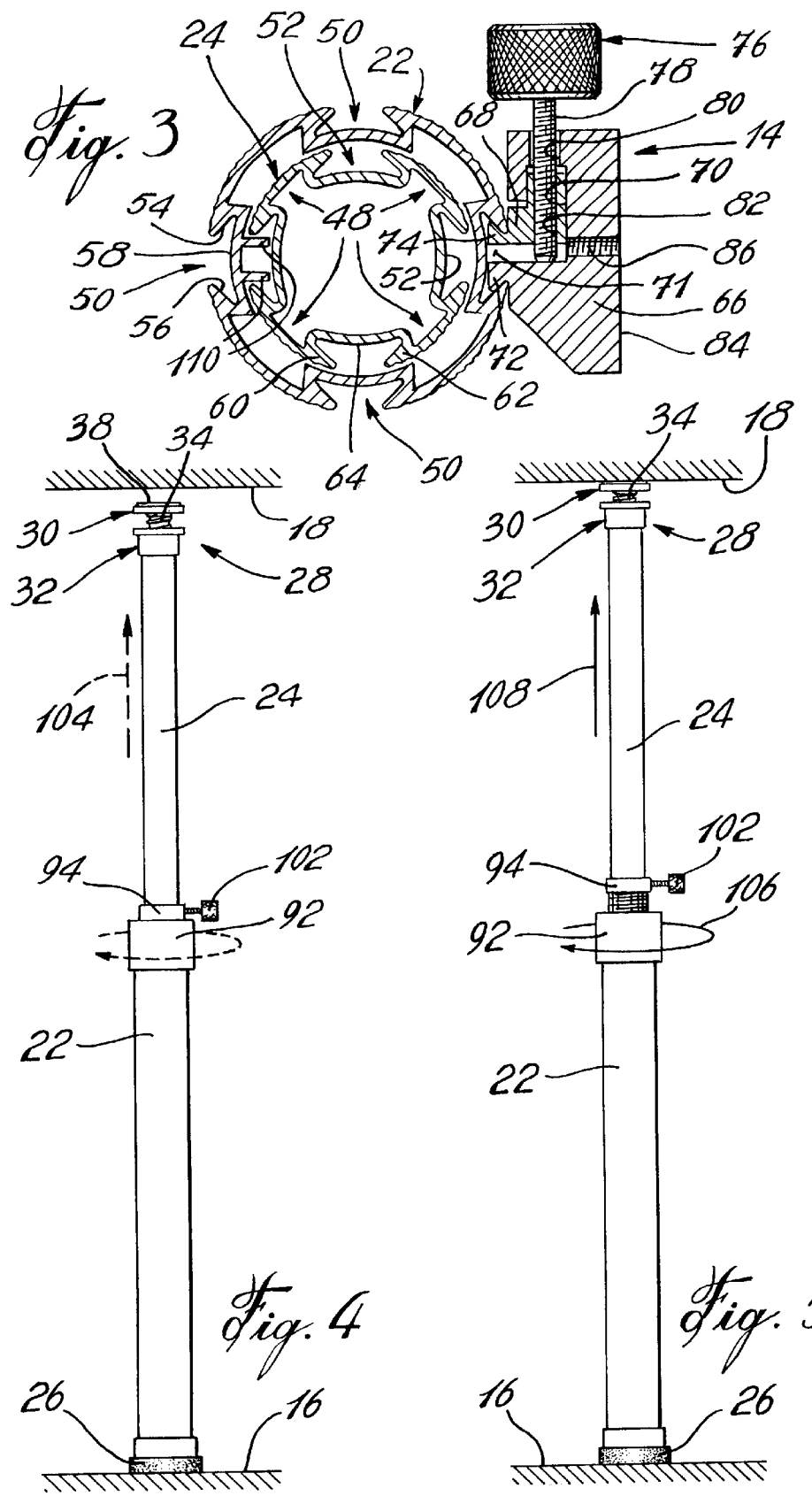

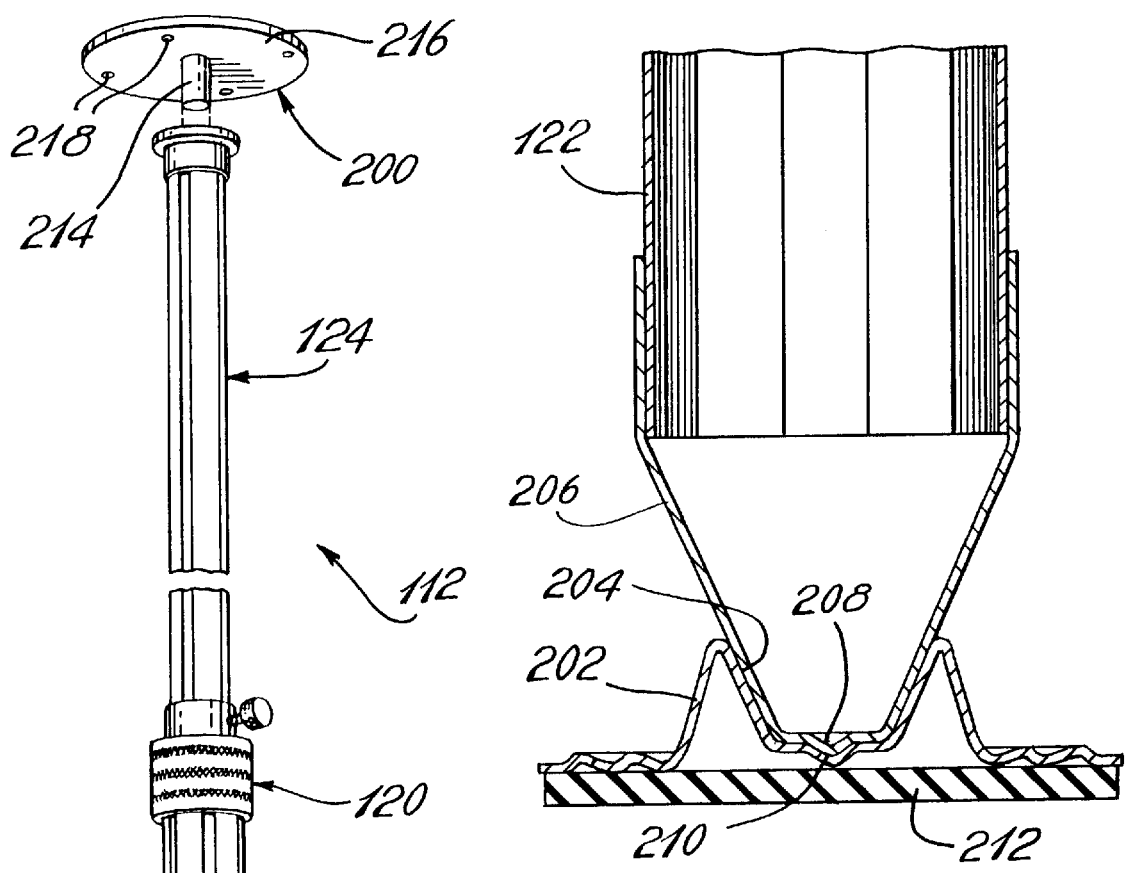
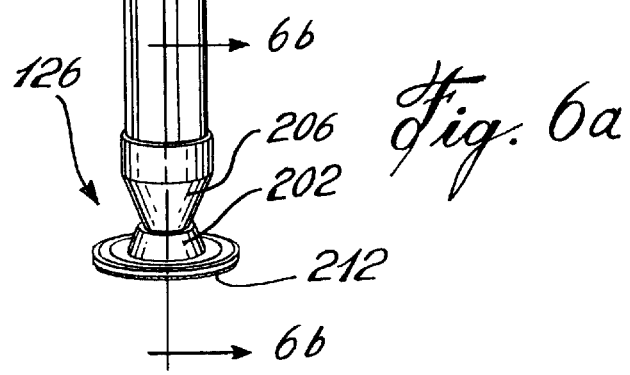
Fig. 6a
Fig. 6b

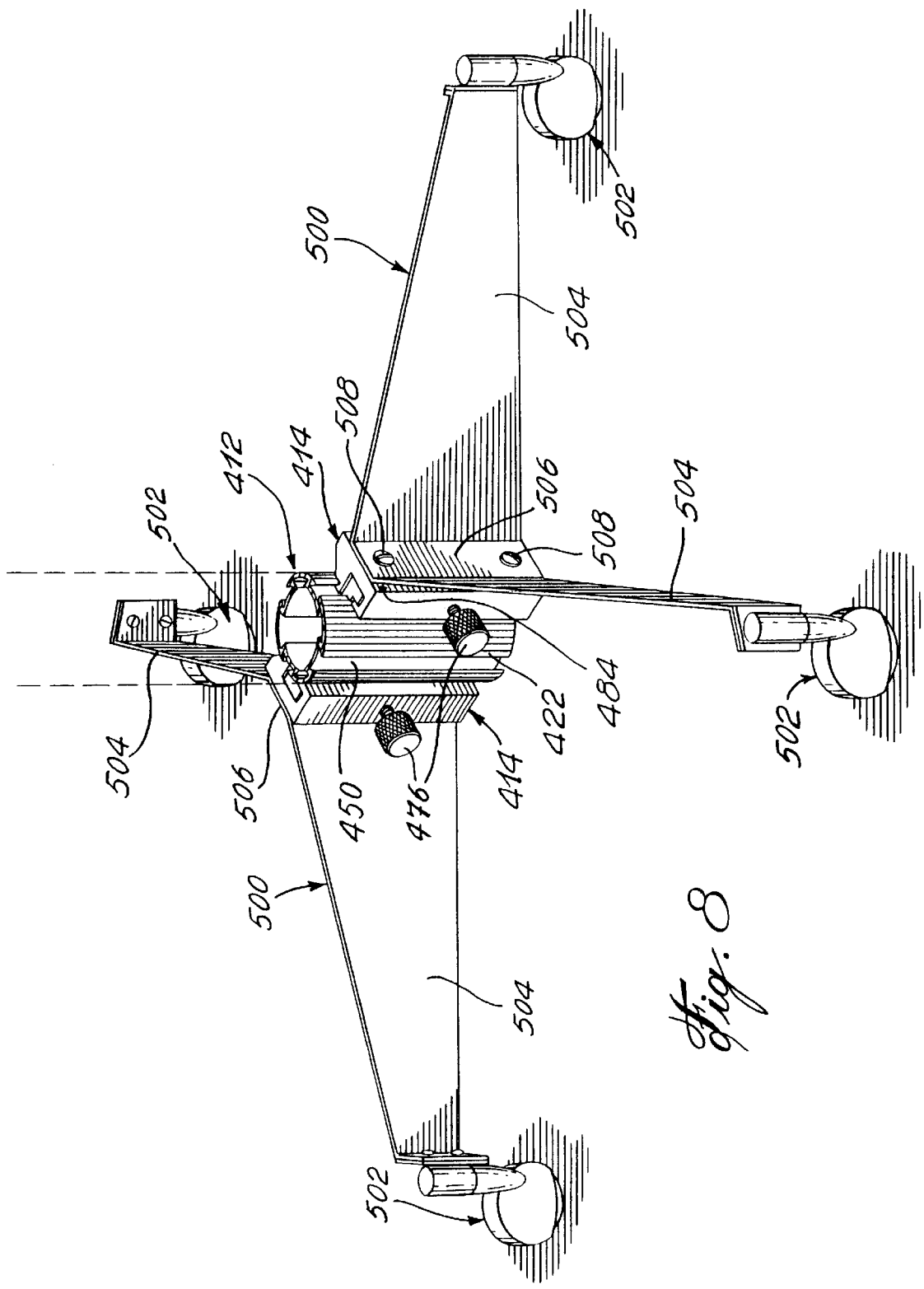

SUPPORT POST WITH ADJUSTABLE ACCESSORY SUPPORTS

BACKGROUND OF THE INVENTION

1. Field of the Invention

The present invention relates to posts and, more particularly, to posts suitable for supporting a variety of accessories.

2. Description of the Prior Art

Over the years various systems have been developed for mounting accessories to an upright post structure. For instance, U.S. Pat. No. 5,813,641 issued on Sep. 29, 1998 to Baldwin discloses a removable bracket for supporting objects from a rectangular upright support structure which has spaced-apart grooves defined in an outer surface thereof. The bracket includes a U-shaped member and a pair of mobile groove engaging members disposed between the legs of the U-shaped member and displaceable therebetween via the operation of threaded fasteners threadably engaged therewith. The bracket is clampingly engaged to the rectangular upright support structure by first positioning the groove engaging members adjacent the corresponding grooves and then tightening the threaded fasteners such as to draw the groove engaging members towards the corresponding legs of the U-shaped member, thereby squeezably urging the groove engaging members against the opposed sides of the corresponding grooves. One drawback of such a system resides in the fact that two independently operable groove engaging members must be set in position in two different grooves. This requires a significant number of adjustments which contributes to increase the time required to install the bracket on the upright support structure.

Therefore, there is a need for a new mounting system in which a support bracket can be readily mounted and removed from an upright support structure with a minimum number of steps.

Furthermore, it has been found that there is a need for a new upright support structure which is adaptable to a wide variety of applications.

SUMMARY OF THE INVENTION

It is therefore an aim of the present invention to provide a new upright mounting structure in which a removable support bracket can be readily and easily installed and adjusted on a support post.

It is also an aim of the present invention to provide a support bracket which can be used to support a variety of accessories.

It is a further aim of the present invention to provide a telescopic support post offering ease of adjustment.

It is a still further aim of the present invention to provide a telescopic post which is adapted to ensure proper alignment of the post segments thereof.

It is a still further aim of the present invention to provide a support bracket which can be used to support an object along different orientations.

It is a still further aim of the present invention to provide a new pivotable upright support post.

It is a still further aim of the present invention to provide a support post which can be easily reconfigured to suit the needs to a given application.

It is a still further aim of the present invention to provide a new mobile base structure for supporting a post on a support surface.

Therefore, in accordance with the present invention there is provided an upright support structure comprising: a post member having at least one longitudinally extending groove defined in a peripheral surface thereof, said groove having a pair of opposed side walls extending from a common base wall, and a support bracket releasably securable at selected axial positions along said groove for allowing an accessory to be mounted in association with said post member, said support bracket including first and second groove engaging members linearly displaceable with respect to one another between a closed position wherein said first and second groove engaging members are both insertable within said groove and an open position wherein said first and second groove engaging members are spread-apart for firmly engaging said opposed side walls of said groove in order to fixedly secure said support bracket to said post member, wherein said first and second groove engaging members are displaceable relative to one another between said open and closed positions through the operation of an actuator, and wherein said first groove engaging member has a body, said body defining a pocket provided with a pair of guiding surfaces with said second groove engaging member being received in slidable engagement between said guiding surfaces in order to constrain said second groove engaging member to translational movement in said pocket.

In accordance with a further general aspect of the present invention, there is provided a mounting bracket for attachment to a structure defining a longitudinal groove having a pair of opposed side walls extending from a base wall, said mounting bracket comprising: a first groove engaging member defining a pocket and having a first jaw adapted to engage one of the side walls of the groove, a second groove engaging member slidably received in said pocket and having a second jaw adapted to engage another one of the side walls of the groove, said pocket being provided with a pair of guiding surfaces between which said second groove engaging member is engaged for constraining said second jaw to linear movement in said pocket parallel to said first jaw and with a fixed orientation with respect thereto, and an actuator for impacting a translational movement to said second jaw towards and away from said first jaw between a first position wherein said first and second jaws are both insertable within said groove and a second position wherein said first and second jaws are spread-apart for firmly engaging the opposed side walls of the groove in order to fixedly secure the mounting bracket to the structure.

In accordance with a further general aspect of the present invention there is provided a telescopic post comprising at least first and second telescopically related post segments, and a locking member operatively connected with said first and second post segments for releasably maintaining said first and second post segments in a fixed position with respect to said locking member, said locking member being expandable and contractible along a longitudinal axis of said telescopic post to provide for length adjustment of said telescopic post.

In accordance with a further general aspect of the present invention there is provided a telescopic post comprising at least first and second telescopically related post segments, said first and second post segments being provided on respective outer surfaces with complementary patterns, and wherein said first and second post segments are provided with cooperating guide means for ensuring alignment of said respective patterns thereof.

In accordance with a further general aspect of the present invention there is provided a pivotable upright support structure comprising a base adapted to rest on a support surface, an overhead fixture depending downwardly from an overhead structure and being in vertical alignment with said base, and a support post extending between said base and said overhead fixture and pivotally mounted thereat for rotational movement about a longitudinal axis of said support post.

In accordance with a further general aspect of the present invention there is provided a mounting bracket for mounting a support to an upright post, comprising a body having post engaging means operatively associated therewith for releasably securing said body at a desired elevation on said upright post, said body defining at least two support receiving cavities extending in different directions for selectively receiving the support in one of two different orientations associated with said support receiving cavities, and releasable securing means for retaining the support in either one of said support receiving cavities.

In accordance with a further general aspect of the present invention there is provided a mounting bracket for mounting a selected one of a variety of supports to an upright post, comprising a body having a longitudinal axis, said body having post engaging means operatively associated therewith for releasably securing said body at a desired elevation on said upright post, said body defining a composite support receiving cavity adapted to selectively receive supports of different shapes and sizes, and releasable securing means for retaining any one of the supports in said composite support receiving cavity.

In accordance with a further general aspect of the present invention there is provided a maneuverable upright support structure comprising a post, and a modular base adapted to support said post on a support surface, said modular base comprising at least two runner supporting members adapted to be independently securely engaging in corresponding grooves defined in an outer surface of said post in order to releasably secure said modular base to said post.

BRIEF DESCRIPTION OF THE DRAWINGS

Having thus generally described the nature of the invention, reference will now be made to the accompanying drawings, showing by way of illustration a preferred embodiment thereof, and in which:

FIG. 3 is a transversal cross-sectional view of a support bracket securely engaged in a peripheral groove of a post segment forming part of the upright support structure of FIG. 1;

FIGS. 4 and 5 are schematic elevational views of the upright support structure illustrating how the locking device is operated to securely mount the upright support structure between the floor and the ceiling;

FIG. 6a is a perspective view of a pivotal upright support post in accordance with a second embodiment of the present invention;

FIG. 6b is an enlarged cross-sectional view taken along line 6b—6b of FIG. 6a;

FIG. 7b is a vertical longitudinal cross-sectional view of the mounting bracket of FIG. 7a; and FIG. 8 is a perspective view of a mobile base structure of an upright post in accordance with a third embodiment of the present invention.

DESCRIPTION OF THE PREFERRED EMBODIMENTS

Figures 1, 2:
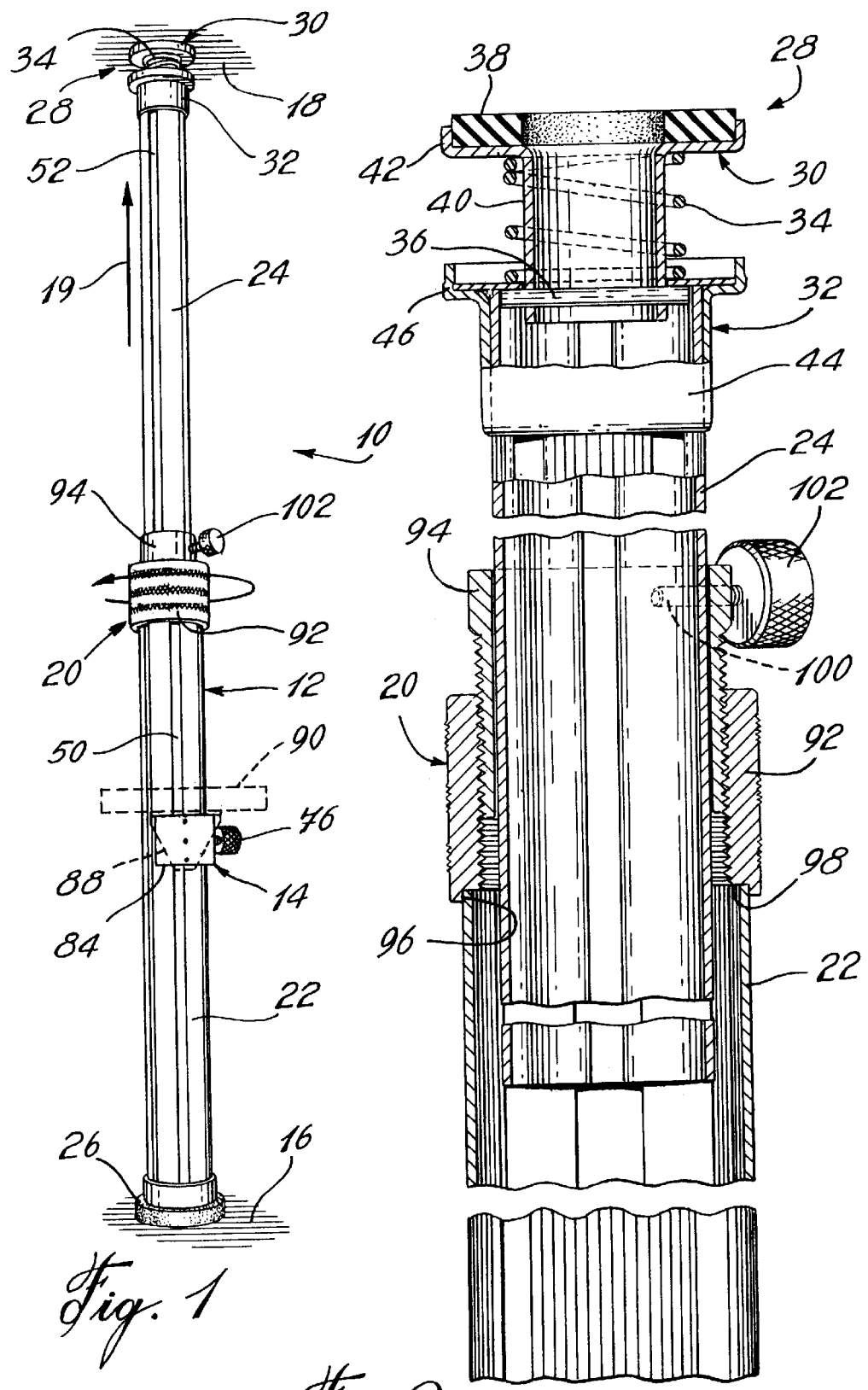
FIG. 1 is a perspective view of an upright support structure securely mounted between a floor and a ceiling in accordance with a first embodiment of the present invention.
FIG. 2 is an enlarged vertical cross-sectional view of the upright support structure illustrating the details of a height adjustment locking device and a spring-loaded cap associated with the upright support structure.

Now referring to the drawings, and in particular to FIG. 1, an upright support structure 10 suitable for supporting a variety of accessories, such as those used to display products in fashion stores, will be described.

The upright support structure 10 comprises a post 12 to which a plurality of removable support brackets, one being shown at 14 in FIG. 1, can be readily fixed at selected positions along the entire length of the post 12 for supporting at various elevations accessories, such as shelves, hangers, lamps or other structural elements forming part of a modular support structure.

As seen in FIG. 1, the post 12 is telescopic and is adapted to be securely mounted between a support surface, such as a floor 16, and an overhead structure, such as a ceiling 18. A locking device 20 is provided to allow the post 12 to be adjustably extended into engagement with the floor 16 and the ceiling 18, as depicted by arrow 19 in FIG. 1, and the fixedly locked in the extended position so that the upper and lower ends of the post 12 remain securely engaged with the ceiling 18 and the floor 16.

More particularly, the post 12 includes a tubular bottom post segment 22 and a tubular top post segment 24 slidably telescoped in the bottom post segment 22 and projecting upwardly therefrom. The bottom and top post segments 22 and 24 are generally cylindrical and preferably formed of a material suitable for manufacture by an extrusion process. A base 26 is provided at the lower end of the bottom post segment 22 to bearingly engage the floor 16 in order to properly support the post 12 thereon. It is understood that the base 26 is preferably at least partly made of a material having a high coefficient of friction. A cap 28 is mounted at the upper terminal end of the top post segment 24 for abutting engagement with the ceiling 18.

As best seen in FIG. 2, the cap 28 is spring-loaded in order to compensate for variations in the vertical distance between the floor 16 and the ceiling 18. More specifically, the cap 28 includes first and second cup-shaped members 30 and 32, a compression spring 34, a locking pin 36 and a ceiling engaging member 38. The first cup-shaped member 30 includes a hollow cylindrical stem portion 40 depending concentrically integrally from a bowl-shaped portion 42. Similarly, the second cup-shaped member 32 includes a hollow cylindrical stem portion 44 depending concentrically integrally from a bowl-shaped portion 46.

The cylindrical stem portion 40 of the first cup-shaped member 30 is disposed to slidably project downwardly into the hollow cylindrical stem portion 44 from a central opening defined in the bottom of the bowl-shaped portion 46. The locking pin 36 is transversally inserted through the lower end of the stem portion 40 to engage an undersurface area of the bowl-shaped portion 46 which surrounds the central opening thereof to prevent axial separation of the first and second cup-shaped members 30 and 32. A radially extending hole (not shown) can be defined in the stem portion 44 of the second cup-shaped member 32 for allowing the locking pin 36 to be inserted in position.

The spring 34 is disposed about the stem portion 40 in a compressed state between the undersurface of the bowl-shaped portion 42 and the top surface of the bowl-shaped portion 46 to urge the first cup-shaped member 30 away from the second cup-shaped member 32. The hollow stem portion 44 of the second cup-shaped member 32 is fitted about the upper end of the top post segment 24 and then secured thereto, such as by clamping deformation. Alternatively, the hollow stem portion 44 could be pressure fitted on the upper end of the top post segment 24.

As seen in FIG. 2, the stem portion 40 and the locking pin 36 are sized and configured to be slidably received within the upper end of the top post segment 24. It is noted that the opposed end portion of the locking pin 36, which projects radially outwardly of the stem portion 40, can be respectively engaged in diametrically opposed longitudinally extending grooves 48 (see FIG. 3) defined in the inner surface of the top post segment 24 in order to prevent rotational movement of the first cup-shaped member 30 relative to the post 12.

The ceiling engaging member 38 is typically provided in the form of a disc or ring and is preferably composed of an elastomeric material. The ceiling engaging member 38 can be glued within the bowl-shaped portion 42 of the first cup-shaped member 30 or otherwise secured thereto.

As seen in FIGS. 1 and 3, the bottom post segment 22 is provided with a number of identical longitudinally extending dovetail grooves 50 circumferentially distributed on the periphery or outer surface thereof. Similarly, the top post segment 24 is provided with a number of identical longitudinally extending dovetail grooves 52 circumferentially distributed on the periphery thereof. According to the illustrated embodiment, there is provided four dovetail grooves 50 and four dovetail grooves 52. The dovetail grooves 50 and 52 are similar to allow a same support bracket 14 to be selectively installed in the grooves 50 and 52 of either one of the bottom and top post segments 22 and 24. It is noted that the grooves 50 and 52 are respectively coextensive with the bottom and top post segments 22 and 24.

As seen in FIG. 3, each dovetail groove 50 is defined by convergent opposed side walls 54 and 56 which extend from a common base wall 58 and form acute angles with the surface thereof. Similarly, each dovetail groove 52 is defined by convergent opposed side walls 60 and 62 which extend from a common base wall 64 and form acute angles with the surface thereof.

The support bracket 14, illustrated in FIG. 3, is adapted to be slidably received in any one of the dovetail grooves 50 and 52, and then releasably secured at a selected fixed position along the selected dovetail groove 50/52 for allowing an accessory to be mounted to the support bracket 14 and thus to the post 12 at a desired elevation. More specifically, the support bracket 14 includes a main body 66 and a lock member 68 slidable transversally within a pocket 70 defined in the main body 66. The pocket 70 has a L-shaped cross-section and is provided with an open slotted upper end 71 to allow part of the lock member 68 to extend through the main body 66. The lock member 68 has a L-shaped cross-section which is complementary to that of the pocket 70.

The main body 66 and the lock member 68 respectively define cooperating stationary and mobile jaw members 72 and 74 extending in opposed lateral outwards directions with respect to the main body 66. The stationary and mobile jaw members 72 and 74 form together a split dovetail which can be securely engaged in any one of the dovetail grooves 50 and 52. As seen in FIG. 3, the mobile jaw member 74 projects outwardly of the pocket 70 through the open slotted upper end 71 thereof. The mobile jaw member 74 can be readily displaced towards and away from the stationary jaw member 72 through the operation of a single actuator 76. The actuator 76 includes a threaded fastener 78 extending through a transversal bore 80 defined in the main body 66 for threadably engaging a threaded transversal bore 82 defined through the lock member 68. The stationary and mobile jaw members 72 and 74 can be displaced relative to one another from a closed position to an open position (see FIG. 3) by simply screwing the threaded fastener 78 into the threaded transversal bore 82 so as to exert a pushing force against the inner surface of the stationary jaw member 72 with the leading end of the threaded fastener 78. Continuous screwing of the threaded fastener 78, after the leading end thereof has been brought against the inner surface of the stationary jaw member 72, pushes the mobile jaw member 74 away from the stationary jaw member 72. By using a pushing action instead of a pulling action as the driving source for the mobile jaw member 74, it has been found that the support bracket 14 could be more easily and firmly secured in clamping engagement with the side walls 54, 56, 60 and 62 of the grooves 50 and 52.

In use, the support bracket 14 is first inserted in a selected one of dovetail grooves 50 and 52, at a desired axial position along the post 12, with the jaw members 72 and 74 in a closed position thereof. Then, the threaded fastener 78 is manually rotatably operated to displace the lock member 68 such as to spread open the jaw members 72 and 74 which then firmly engage the side walls 54,56/60,62 of the selected dovetail groove 50/52, thereby locking the support bracket 14 at the selected position along the post 12. The above described construction of the support bracket 14 is advantageous in that by displacing the mobile jaw member 74 towards the stationary jaw member 72 to a closed or partially-closed position, it becomes possible to readily engage the support bracket 14 at any axial location in a selected dovetail groove 50/52 without having to slidably engage the support bracket 14 in the selected dovetail groove 50/52 through an extremity thereof. Accordingly, the support bracket 14 can be easily mounted and removed from the post 12 even though the same is securely mounted between the floor 16 and the ceiling 18 and its open ends are not accessible.

As seen in FIGS. 1 and 3, the support bracket 14 has a planar mounting surface 84 through which threaded bores 86 are defined for receiving corresponding threaded fasteners (not shown) in order to secure thereto a variety of supports. For instance, as seen in dotted lines in FIG. 1, a shelf support 88 can be mounted to the planar mounting surface 84 of the support bracket 14 in order to mount a shelf 90 in association with the post 12.

As mentioned hereinbefore, the relative position of the top post segment 24 with respect to the bottom post segment 22 is set by the locking device 20. As seen in FIG. 2, the locking device 20 generally includes first and second concentric collars 92 and 94. The second collar 94 extends downwardly within the first collar 92 and is threadably engaged therewith. The bottom end of the first collar 92 is formed with a recess 96 for receiving the upper end of the bottom post segment 22. The recess 96 defines an annular shoulder 98 adapted to be seated against the top annular surface of the bottom post segment 22. A radially extending threaded bore 100 is defined through the upper end portion of the second collar 94 for receiving a locking screw 102. The locking screw 102 can be manually operated to selectively secure the second collar 94 to the top post segment 24 which is slidably mounted therein.

As seen in FIGS. 4 and 5, the locking device 20 provides for fine adjustment of the length of the post 12 by first allowing a macrometric length adjustment of the post 12 followed by a micrometric one. This two-step length adjustment sequence is particularly convenient for securely mounting the post 12 between the floor 16 and the ceiling 18. First, the top post segment 24 is slidably extended from the bottom post segment 22, as indicated by arrow 104, to a vertically extended position wherein the upper end of the top post segment 24 is close (or loosely engaged) to the ceiling 18. Thereafter, the locking screw 102 is manually operated to secure the second collar 94 to the top post segment 24. Once this locking operation has been completed, the first collar 92 is rotated in the direction indicated by arrow 106 in FIG. 5 to incrementally displace the second collar 94 and, thus, the top post segment 24 axially upwardly relative thereto, as depicted by arrow 108, so as to bring the spring loaded cap 28 of the post 12 firmly against the ceiling 18, thereby securely mounting the post 12 between the floor 16 and the ceiling 18. As seen in FIG. 5, the spring 34 is maintained in a compressed state, for instance, such as to compensate for small variations in the distance between the floor 16 and the ceiling 18.

The above described locking device 20 advantageously provides for incremental adjustment of the overall length of the post 12. The term incremental is herein intended to mean any gradual controlled change, irrespectively if it consists of an increase or decrease.

As seen in FIG. 3, a pair of spaced-apart projections 110 extend inwardly from an inner surface of the bottom post segment 22 along the entire length thereof. The projections 110 are equally spaced from the center line of a corresponding dovetail groove 50 of the bottom post segment 22 and extend fittingly between the free ends of the convergent side walls 60 and 62 of an associated dovetail groove 52 of the top post segment 24 to ensure axial alignment of dovetail grooves 50 with dovetail grooves 52. The projections 110 cooperate with the associated dovetail groove 52 to virtually prevent any rotational movement between the top and bottom post segments 22 and 24, thereby preventing the dovetail grooves 50 and 52 from being displaced out of phase with respect to each other. It is understood that this internal guiding structure could be used to ensure proper alignment of any other type of complementary patterns appearing on respective outer surfaces of the post segments of a given telescopic post.

FIGS. 6a and 6b illustrate a second embodiment of the present invention wherein like parts are identified by the same reference numerals used for the first embodiment but with the suffix "1". The second embodiment comprises a telescopic post 112 mounted on a swivel base 126 and retained against lateral movements at an upper end thereof through the use of an overhead vertical pivot 200 fixed to the ceiling and depending vertically downwardly into the open upper end of a tubular top post segment 124. According to this construction, the post 112 can be easily pivoted about its longitudinal axis to change the orientation, for instance, of a shelf mounted in association therewith.

As seen in FIG. 6b, the swivel base 126 includes a socket 202 defining a generally truncated conical cavity 204 adapted to receive a complementary frusto-conical cap 206 inserted over the lower end of a bottom post segment 122. The truncated conical cap 206 is seated in the truncated conical cavity 204 and has a central embossment 208 extending outwardly from an undersurface thereof for engagement in a corresponding central depression 210 formed in the inner surface of the bottom wall of the truncated conical cavity 204. The embossment 208 and the depression 210 form a central point of pivot for the post 112.

A disc 212 made of a non-slip material is secured to the undersurface of the socket 202 to prevent displacement of the base 126 on the floor.

As seen in FIG. 6a, the overhead pivot 200 includes a pivot pin 214 depending vertically downwardly from the center of a disc 216 defining a number of bores 218 through which threaded fasteners (not shown) may be inserted to secure the overhead pivot 200 to a given ceiling structure or the like. The pivot pin 214 is sized and configured to be received within the upper end of the top post segment 124 and allow the same to freely rotate thereabout.

Figure 7A:
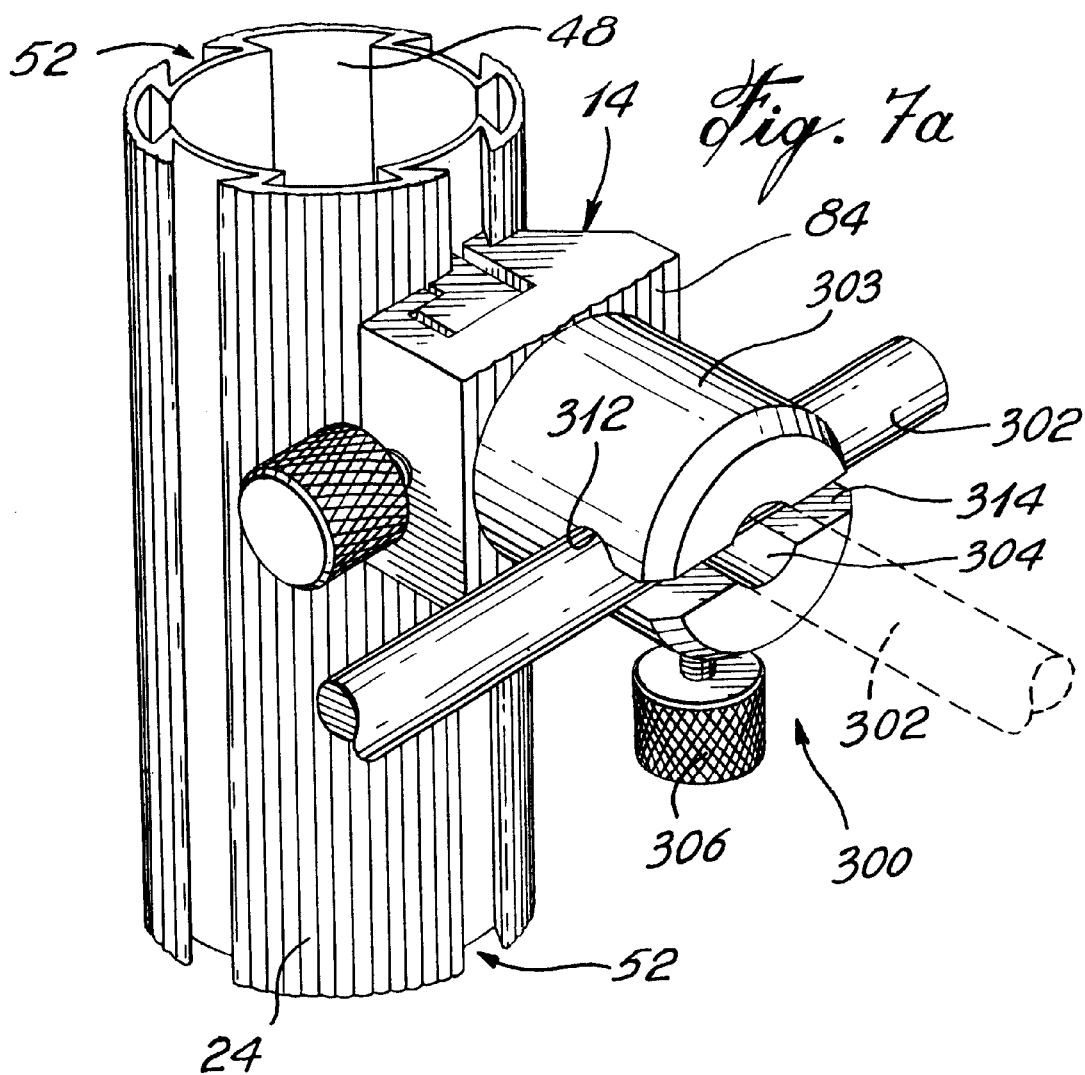
FIG. 7a is an enlarged perspective view of a mounting bracket adapted to support a hanger from the post in one of two orthogonal directions.
Figure 7B:
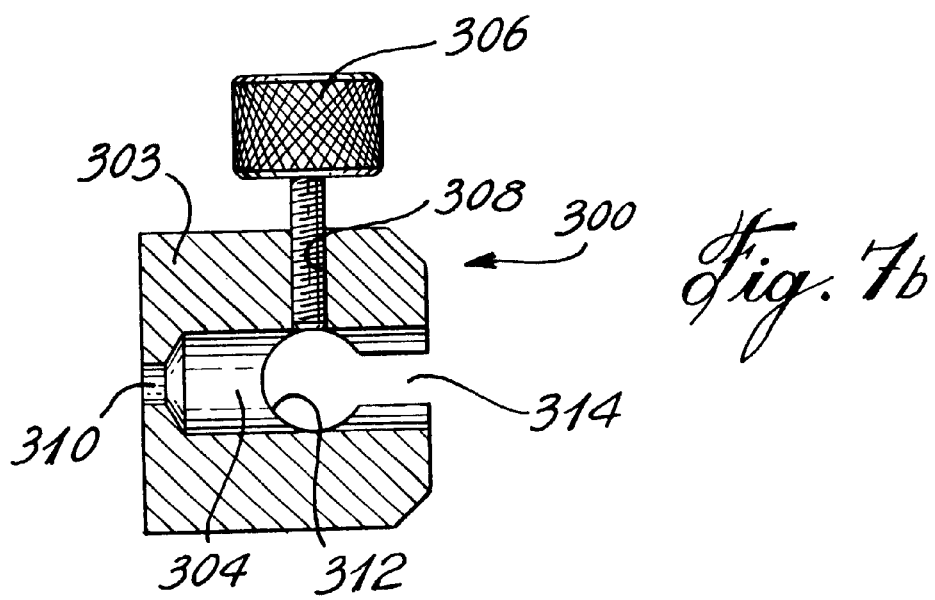

FIGS. 7a and 7b illustrate a universal mounting adapter 300 which can be secured to the planar mounting surface 84 of the support bracket 14 for supporting a cantilever-like hanger 302 from the post 12 in either one of two orthogonal directions or, alternatively, to support a shelf (not shown). The universal mounting adapter 300 has a cylindrical body 303 defining a central longitudinally extending hole 304 in which the hanger 302 can be slidably inserted (as depicted in dotted lines in FIG. 7a), and subsequently locked therein through the operation of a locking screw 306 threadably engaged in a transversal threaded bore 308 intercepting the longitudinally extending hole 304. A through bore 310 is machined in the bottom wall of the longitudinally extending hole 304 for receiving a screw (not shown) in order to secure the universal mounting adapter 300 to the support bracket 14.

A transversal hole 312 is defined through the body 303 at right angles with respect to the longitudinally extending hole 304 at a location intersecting the transversal threaded bore 308. As seen in FIG. 7a, the transversal hole 312 is adapted to slidably receive the hanger 302 (shown in full lines) which can then be locked therein through the operation of the locking screw 306. A rectangular open ended slot 314 is defined in the distal end portion of the body 303 for receiving one side of a shelf (not shown). The open ended slot 314 extends to the transversal hole 312, thereby allowing the side of the shelf to be properly positioned and to be securely engaged by the locking screw 306. The open ended slot 314 also intersects the longitudinally extending hole 304 and is centrally disposed with respect thereto.

The longitudinally extending hole 304, the transversal hole 312 and the open ended slot 314 form a composite support receiving cavity in which a variety of cantilever supports can be selectively installed in different orientations. According to the illustrated embodiment, the hanger 302 is provided in the form of a cylindrical pin although other shapes can be contemplated by modifying the holes 304 and 312 of the adapter 300. It is understood that the universal mounting bracket 300 and the support bracket 14 could be of unitary construction.

FIG. 8 illustrates how a pair of removable support brackets 414 (similar to support bracket 14) can be used in association with a pair of V-shaped brackets 500 to form a wide base structure provided with conventional caster wheels 502 to support a post 412 on a floor. Each V-shaped bracket 500 includes a pair of diverging legs 504 extending integrally from opposed sides of a common mounting web 506 defining a pair of spaced-apart holes (not shown) for allowing screws 508 to pass therethrough in order to secure the V-shaped bracket 500 to a mounting surface 484 of an associated one of the supporting brackets 414 which are securely engaged in diametrically opposed dovetails grooves 450 at the lower end of a bottom post segment 422 of the post 412. Each bracket 414 is provided with a set screw 476 operable to move the jaws of the bracket 414 towards or away from one another, as explained herein before. The distal end of each leg 504 is bent and provided with a sleeve coupled to the caster wheel 502.

It is noted that each V-shaped bracket 500 could also be used to secure the pole 412 to a wall or, alternatively, installed in an inverted position to provide a horizontal bearing surface upon which a shelf could be supported.

It is understood that the post 12 could include more than two telescopic post segments or, alternatively formed of a single post segment. Furthermore, the post 12 could be used as a free standing structure which does not extend to a ceiling structure, as described hereinbefore.

What is claimed is:

1. A mounting bracket for attachment to a structure defining a longitudinal groove having a pair of opposed side walls extending from a base wall, said mounting bracket comprising: a first groove engaging member defining a pocket and having a first jaw adapted to engage one of the side walls of the groove, a second groove engaging member slidably received in said pocket and having a second jaw adapted to engage another one of the side walls of the groove, said pocket being provided with a pair of guiding surfaces between which said second groove engaging member is slidably engaged for constraining said second jaw to linear movement in said pocket parallel to said first jaw and with a fixed orientation with respect thereto, and an actuator for imparting a translational movement to said second jaw towards and away from said first jaw between a first position wherein said first and second jaws are both insertable within said groove and a second position wherein said first and second jaws are spread-apart for firmly engaging the opposed side walls of the groove in order to fixedly secure the mounting bracket to the structure, wherein said pocket and said second groove engaging member have a complementary L-shaped cross-section.

2. A mounting bracket as defined in claim 1, wherein said actuator extends transversally through said first groove engaging member into said pocket for threadably engaging said second groove engaging member.

3. A mounting bracket as defined in claim 1, wherein said actuator has a leading end abutting against a surface of said first groove engaging member for displacing said second groove engaging member away from said first groove engaging member towards said second position by applying a pushing force against said surface of said first groove engaging member in a direction away from said second groove engaging member.

4. An upright support structure comprising: a post member having at least one longitudinally extending groove defined in a peripheral surface thereof, said groove having a pair of opposed side walls extending from a common base wall, and a support bracket releasably securable at selected axial positions along said groove for allowing an accessory to be mounted in association with said post member, said support bracket including first and second groove engaging members displaceable with respect to one another between a closed position wherein said first and second groove engaging members are both insertable within said groove and an open position wherein said first and second groove engaging members are spread-apart for firmly engaging said opposed side walls of said groove in order to fixedly secure said support bracket to said post member, wherein said post member includes at least first and second telescopically related post segments, said first and second post segments being each provided with at least one longitudinally extending peripheral groove, said peripheral groove of said first post segment being similar to that of said second post segment to allow said support bracket to be selectively mounted to either one of said first and second post segments.

5. An upright support structure comprising: a post member having at least one longitudinally extending groove defined in a peripheral surface thereof, said groove having a pair of opposed side walls extending from a common base wall, and a support bracket releasably securable at selected axial positions along said groove for allowing an accessory to be mounted in association with said post member, said support bracket including first and second groove engaging members displaceable with respect to one another between a closed position wherein said first and second groove engaging members are both insertable within said groove and an open position wherein said first and second groove engaging members are spread-apart for firmly engaging said opposed side walls of said groove in order to fixedly secure said support bracket to said post member, wherein said post member includes at least first and second telescopically related post segments, and wherein a locking member is operatively connected with said first and second post segments for releasably maintaining said first and second post segments in a fixed position with respect to said locking member, said locking member being expandable and contractible along a longitudinal axis of said post member to provide for length adjustment thereof.

* * * * *